United States Patent
Zhang et al.

(10) Patent No.: US 12,131,234 B2
(45) Date of Patent: Oct. 29, 2024

(54) CODE GENERATION FOR DEPLOYMENT OF A MACHINE LEARNING MODEL

(71) Applicant: Capital One Services, LLC, McLean, VA (US)

(72) Inventors: Yu Zhang, Midlothian, VA (US); Anshuman Guha, Columbia, MD (US); Kyle Moore, Midlothian, VA (US); Animesh Mod, Glen Allen, VA (US); Christopher Bjorgolfsson, Glen Allen, VA (US); Wenyan Huang, Fairfax, VA (US); Lok Yi Lam, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 1030 days.

(21) Appl. No.: 17/082,653

(22) Filed: Oct. 28, 2020

(65) Prior Publication Data

US 2022/0129789 A1 Apr. 28, 2022

(51) Int. Cl.
*G06N 20/00* (2019.01)
*G06F 8/35* (2018.01)
*G06F 11/36* (2006.01)

(52) U.S. Cl.
CPC .............. *G06N 20/00* (2019.01); *G06F 8/35* (2013.01); *G06F 11/3684* (2013.01)

(58) Field of Classification Search
CPC ........ G06N 20/00; G06F 8/35; G06F 11/3684
See application file for complete search history.

(56) References Cited

U.S. PATENT DOCUMENTS

| | | | | |
|---|---|---|---|---|
| 10,747,651 | B1 * | 8/2020 | Vanderwall | G06F 11/3684 |
| 11,429,893 | B1 * | 8/2022 | Tong | G06N 20/00 |
| 2010/0332192 | A1 * | 12/2010 | Lin | G06F 8/51 |
| | | | | 702/189 |
| 2016/0154644 | A1 * | 6/2016 | Chhawchharia | G06F 9/44542 |
| | | | | 717/121 |
| 2017/0161640 | A1 * | 6/2017 | Shamir | G06N 20/00 |
| 2021/0334700 | A1 * | 10/2021 | Nagaraja | G06N 20/00 |
| 2022/0067752 | A1 * | 3/2022 | Fang | H04L 63/20 |
| 2022/0121994 | A1 * | 4/2022 | Sun | G06N 20/00 |

OTHER PUBLICATIONS

Ferguson, Max, et al. "A standardized representation of convolutional neural networks . . . " International Design Engineering Technical Conferences and Computers and Information in Engineering Conference. vol. 59179. American Society of Mechanical Engineers, 2019. (Year: 2019).*

* cited by examiner

*Primary Examiner* — Kevin L Young
*Assistant Examiner* — Joanne G Macasiano
(74) *Attorney, Agent, or Firm* — Harrity & Harrity, LLP

(57) ABSTRACT

In some implementations, a system may receive a first set of files output based on a machine learning model that is trained using training data that includes a set of values, for each of multiple observations, that corresponds to a set of features. The system may receive a second set of files that includes information that identifies a set of valid values corresponding to the set of features. The system may generate, based on the first set of files and the second set of files, code for generating the output score from the trained model based on a set of input values that are input to the trained model. The system may deploy the code for execution in a computing environment.

20 Claims, 11 Drawing Sheets

CODE GENERATION FOR DEPLOYMENT OF A MACHINE LEARNING MODEL

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

SUMMARY

In some implementations, a system for generating code for deploying a trained model based on one or more files output in association with generating the trained model includes memory; and one or more processors, communicatively coupled to the memory, configured to: determine a set of features, to be used as input to the trained model, based on training a machine learning model using training data that includes a set of values, for each of multiple observations, that corresponds to the set of features; generate a model algorithm for the trained model based on training the machine learning model, wherein the model algorithm defines a manner in which an output score is generated from the set of features and from a set of model parameters that are determined based on training the machine learning model; output a feature file that identifies the set of features; output a model file that identifies the model algorithm; receive an exception handling file that identifies a set of valid values corresponding to the set of features; generate, based on the feature file and the exception handling file, first code that includes a context object that identifies, for a feature of the set of features, a set of valid values for the feature; generate, based on the model file, second code for generating the output score based on a set of variable values, corresponding to the set of features, and the set of model parameters; generate, based on the model file, third code that is executed if an invalid value is received for the feature; and deploy the trained model in a computing environment based on the first code, the second code, and the third code.

In some implementations, a method for generating code for deploying a trained model based on one or more files output in association with generating the trained model includes receiving, by a system, a first set of files output based on a machine learning model that is trained using training data that includes a set of values, for each of multiple observations, that corresponds to a set of features, wherein the first set of files includes information that identifies the set of features and a model algorithm, for the trained model, that includes a function for generating an output score based on the set of features and a set of model parameters that are determined based on training the machine learning model; receiving, by the system, a second set of files that includes information that identifies a set of valid values corresponding to the set of features; generating, by the system and based on the first set of files and the second set of files, code for generating the output score from the trained model based on a set of input values that are input to the trained model, wherein the code includes: a data object that identifies, for a feature of the set of features, a set of valid values for the feature, one or more instructions for generating the output score based on a set of variable values, corresponding to the set of features, and the set of model parameters, and one or more instructions that are executed if an invalid value is received for the feature; and deploying, by the system, the code for execution in a computing environment.

In some implementations, a non-transitory computer-readable medium storing a set of instructions includes one or more instructions that, when executed by one or more processors of a device, cause the device to: generate, based on a first file that is output as part of training a machine learning model, code for a first module of a computer program, wherein the code for the first module causes reception of a set of input values that are input to the computer program and mapping of the set of input values to a set of features identified based on the first file, and wherein the computer program, when executed, generates an output from a trained machine learning model based on the set of input values; generate, based on a second file that is output as part of training a machine learning model, code for a second module of the computer program, wherein the code for the second module causes a model algorithm, identified based on the second file, to be applied to the set of input values to generate the output; and store the computer program, including the code generated for the first module and the code generated for the second module, in memory of the device.

DETAILED DESCRIPTION

Figure 1A:
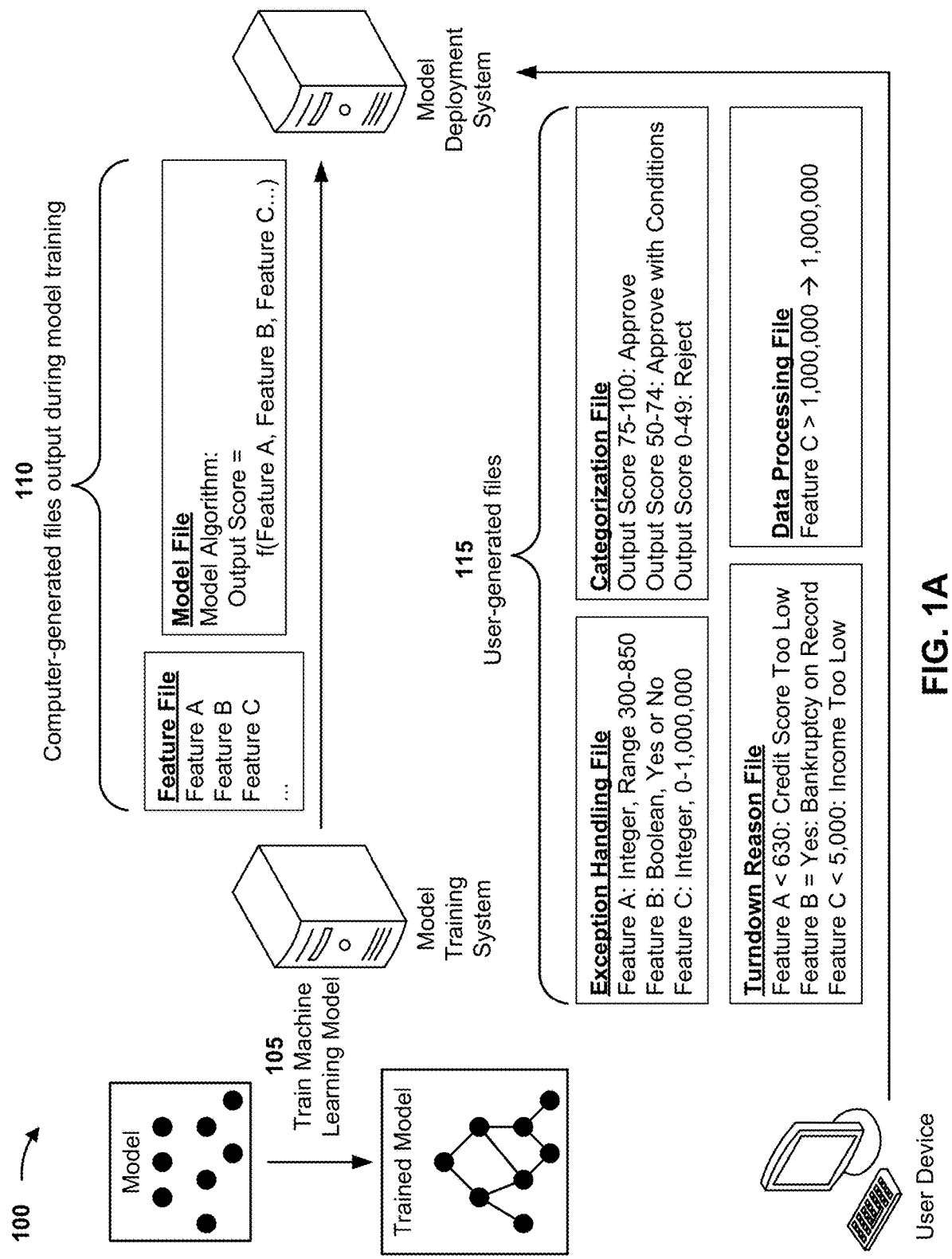
FIGS. 1A-1F are diagrams of an example implementation relating to code generation for deployment of a machine learning model.

The following detailed description of example implementations refers to the accompanying drawings. The same reference numbers in different drawings may identify the same or similar elements.

Machine learning algorithms are used to train machine learning models that, once trained, may be used to make predictions, decisions, or classifications relating to new observations. Machine learning models may be trained and applied for a wide variety of applications. However, once a machine learning model is trained, it may be difficult to deploy the machine learning model in a production environment to perform the task for which the machine learning model is trained, especially if the same machine learning model needs to be deployed to perform the task in multiple scenarios (e.g., real-time decision-making, processing a single set of inputs for a single decision, or batch processing multiple sets of inputs for multiple decisions) and/or if the same machine learning model needs to be deployed in multiple production environments (e.g., for the different scenarios). In some cases, containerization may be used for deploying a trained machine learning model. Containerization refers to encapsulating an application, such as an application deploying a trained machine learning model, in a container with its own operating environment. In some cases, the code for deploying the machine learning model may be packaged into the container along with the dependencies, libraries, and configuration files for the code.

The container for a trained machine learning model is typically created by a software developer, and is typically complicated, with a large number of functions and the included dependencies wrapped in a nested structure. In some cases, the code for deploying the machine learning model may be implemented using a suite of microservices. Microservices are modules or packages of code that perform particular functions and use an interface to communicate with each other. Individual steps for deploying the machine learning model may correspond to respective microservices.

The deployment of a trained machine learning model, as described above, typically requires a large amount of code and a large number of dependencies and linkages, among the modules in the code to, be included within the container. This results in a large application that may be difficult to build, execute (e.g., run), and maintain. For example, a large application with a complicated structure may take a long time to launch and/or execute. Furthermore, a large application may require more memory resources to store than a small application. In addition, the application may require a large amount of processing power to deploy. Furthermore, the complicated structure and large number of dependencies may make it difficult to adjust or update an aspect of the machine learning model. For example, any changes to the machine learning model may need to be propagated throughout the different modules based on the dependencies between the modules. This may take a long time and may be subject to errors, which may result in incomplete deployment of the machine learning model or a model that, when deployed, is prone to output erroneous results.

Some implementations described herein enable automatic code generation for deployment of a machine learning model. For example, a system may train a machine learning model and may output files resulting from the training. The files may include a feature file that identifies a set of features and a model file that identifies a model algorithm. The system may receive an exception handling file. The system may generate, based on the feature file and the exception handling file, first code that includes a context object that identifies a set of valid features. The system may generate, based on the model file, second code for generating an output score based on variable values corresponding to the set of features. The system may generate third code that is executed is an invalid value is received for a feature. The system may deploy the trained model in a computing environment based on the first code, the second code, and the third code. For example, the first code, the second code, and the third code may be used to generate respective modules of a core model assembly, which may be included within a wrapper (e.g., an input/output wrapper) in a container.

As a result, the building time for generating the container for deploying the trained model may be reduced, and the resulting model may have less code and fewer dependencies in the container. Accordingly, the time for launching and running the trained model may be reduced. Additionally, the trained model may consume fewer memory resources. Furthermore, the code generated for deploying the trained model may be easily updated by providing a new file or files from which the code is generated. Furthermore, the techniques described herein are model agnostic, meaning that these techniques can be applied to any type of machine learning model, as well as any type of production environment and multiple scenarios, as described above, thereby providing flexibility in model deployment.

FIGS. 1A-1F are diagrams of an example 100 associated with code generation for deployment of a machine learning model. As shown in FIGS. 1A-1F, example 100 includes a model training system, a model deployment system, a user device, and a computing system. These devices are described in more detail in connection with FIGS. 4 and 5.

As shown in FIG. 1A, and by reference number 105, the model training system may train a machine learning model. The model training system may train the machine learning model based on a set of training data using a machine learning algorithm. The machine learning model may be trained using any machine learning algorithm. The machine learning model may be trained to perform any task. In example 100, the machine learning model is trained to make decision regarding whether to issue a credit card to an applicant. Examples of training a machine learning model are described in more detail below in connection with FIG. 2.

As part of training of the machine learning model (e.g., during or after model training), the model training system may determine a set of features to be used as input to the trained model for each observation of multiple observations included in the training data. In some implementations, the set of features determined during the training may be a subset of a set of variables associated with each observation.

As part of training of the machined learning model, the model training system may also generate a model algorithm for the trained model. The model algorithm may define a manner in which an output score is generated from the set of features and from a set of model parameters that are determined during training. For example, the model algorithm may be a mathematical model or function, such as a regression function, that calculates the output score for an observation as a function of the input set of features for the observation and one or more learned model parameters, such as weights and/or biases. Additionally, or alternatively, the model algorithm may be an algorithm that performs a series of operations with learned model parameters on the input set of features. For example, the model algorithm may be a decision tree model or a random forest model, among other examples. In some implementations, the model algorithm may include boosting operations, such as extreme gradient boosting, may include regression operations, such as logistic regression, and/or may include other operations. In some implementations, the output score may be a probability score between 0 and 1.

As further shown in FIG. 1A, and by reference number 110, the model training system may output computer-generated files during training, and a model deployment system may receive the computer-generated files. As part of training of the machine learning model, the model training system may generate one or more files, such as a feature file and/or model file (shown as separate files, but which may be included in a single file). The feature file may identify the set of features determined a part of model training (shown as features A, B, and C). For example, the features in the set of features may be identified by feature names or feature numbers associated with the features. The model file may identify the model algorithm for the trained model determined a part of model training. As described above, the model algorithm may include a set of learned model parameters and/or operations performed for calculating a model score from the input features and the learned model parameters. In some implementations, multiple model files may be output as part of model training. In this case, each model file may identify respective model parameters and a respective model algorithm or set of operations to perform.

As further shown in FIG. 1A, and by reference number 115, the model deployment system may receive, from a user device, user-generated files relating to the trained model. The user-generated files may include, for example, an exception handling file, a categorization file, a turndown reason file, and/or a data processing file. In some implementations, all or a subset of the user-generated files may be combined into a single file.

The exception handling file may identify a set of valid values corresponding to the set of features. For example, the exception handling file may identify a set of valid values for each feature in the set of features. For a feature in the set of features, the exception handling file may identify a data type for the feature, a minimum valid value for the feature, a maximum valid value for the feature, a default value for the feature (e.g., when an input value is not received for the feature, such as for an optional user input), and/or a set of valid enumerated values for the feature. In example 100, Feature A may correspond to a credit score for a credit application. As shown in FIG. 1A, the exception handling file indicates that the data type for Feature A is an integer and the range of valid values for Feature A is 300-850. In example 100, Feature B may correspond to an indication of whether an applicant, applying for credit, has had a bankruptcy. As shown in FIG. 1A, the exception handling file indicates that the data type for Feature B is a Boolean and the valid values for Feature B are "Yes" or "No." In example 100, Feature C may correspond to an annual income for the applicant. As shown in FIG. 1A, the exception handling file indicates that the data type for Feature C is an integer and the range of valid values for Feature A is 0-1,000,000.

In some implementations, the exception handling file may also include mappings of exception actions to invalid feature values. An exception action may indicate an action to be performed if an invalid value (or no value) is received as input when the deployed model is executing (e.g., notify an operator by sending an email or another type of message). In some implementations, the model may execute and may calculate an output score based on such execution, and the output score may be associated with a category indicative of an exception and/or the exception action, which causes the exception action to be performed.

The categorization file may identify mappings between groups of output scores and corresponding categories. As described above, the output score may be between 0 and 1, as an example. Alternatively, the output score may be represented as a percentage between 0 and 100. The categorization file may identify different ranges of output score values that result in classification, by the trained model, into corresponding categories. For example, as shown in FIG. 1A, the categorization file may indicate that an output score between 0-49 (inclusive) corresponds to the applicant being rejected, an output score between 50-74 (inclusive) corresponds to the applicant being approved with one or more conditions, and an output score between 75-100 (inclusive) corresponds to the applicant being approved.

The turndown reason file may identify mappings between sets of input values for the features and corresponding turndown reasons. A turndown reason may be a reason or explanation that is provided to the applicant (e.g., for display on a user interface of a device used by the applicant to apply for credit) if the trained model determines that the applicant is rejected (or approved with conditions). For example, as shown in FIG. 1A, a turndown reason may include the applicant's credit score being too low (e.g., if a value of Feature A, corresponding to a credit score, is below 630), a bankruptcy on record for the applicant (e.g., if a value of Feature B, corresponding to whether the applicant has had a bankruptcy, is "Yes"), and/or the applicant's annual income is too low (e.g., if a value of Feature C, corresponding to annual income, is below 5,000). In some implementations, the turndown reason file may include other communications relating to various determinations, classifications, or predictions by the trained model. The turndown reason file may more generally be an explanation file (or an adverse action file) that identifies mappings between sets of input values for the features and corresponding explanations (or adverse actions). An explanation (or adverse action) may be used to provide a reason that indicates why the trained model categorized the set of input values into a particular category.

The data processing file may identify mappings between input values for one or more features and corresponding processed input values to be used as input to the trained model. For example, a feature may have some values that are to be pre-processed prior to being input to the trained model. The data processing file indicates which values of which features are to be pre-processed and what processing is to be performed. For example, as shown in FIG. 1C, the data processing file may indicate that values over 1,000,000 for Feature C are to be set to 1,000,000. In some implementations, the data processing may modify an input value to a modified input value. Additionally, or alternatively, the data processing may modify an input value to a new input value that is associated with a new feature in the feature set. In some implementations, the data processing may merge multiple features into a single feature.

Figure 1B:
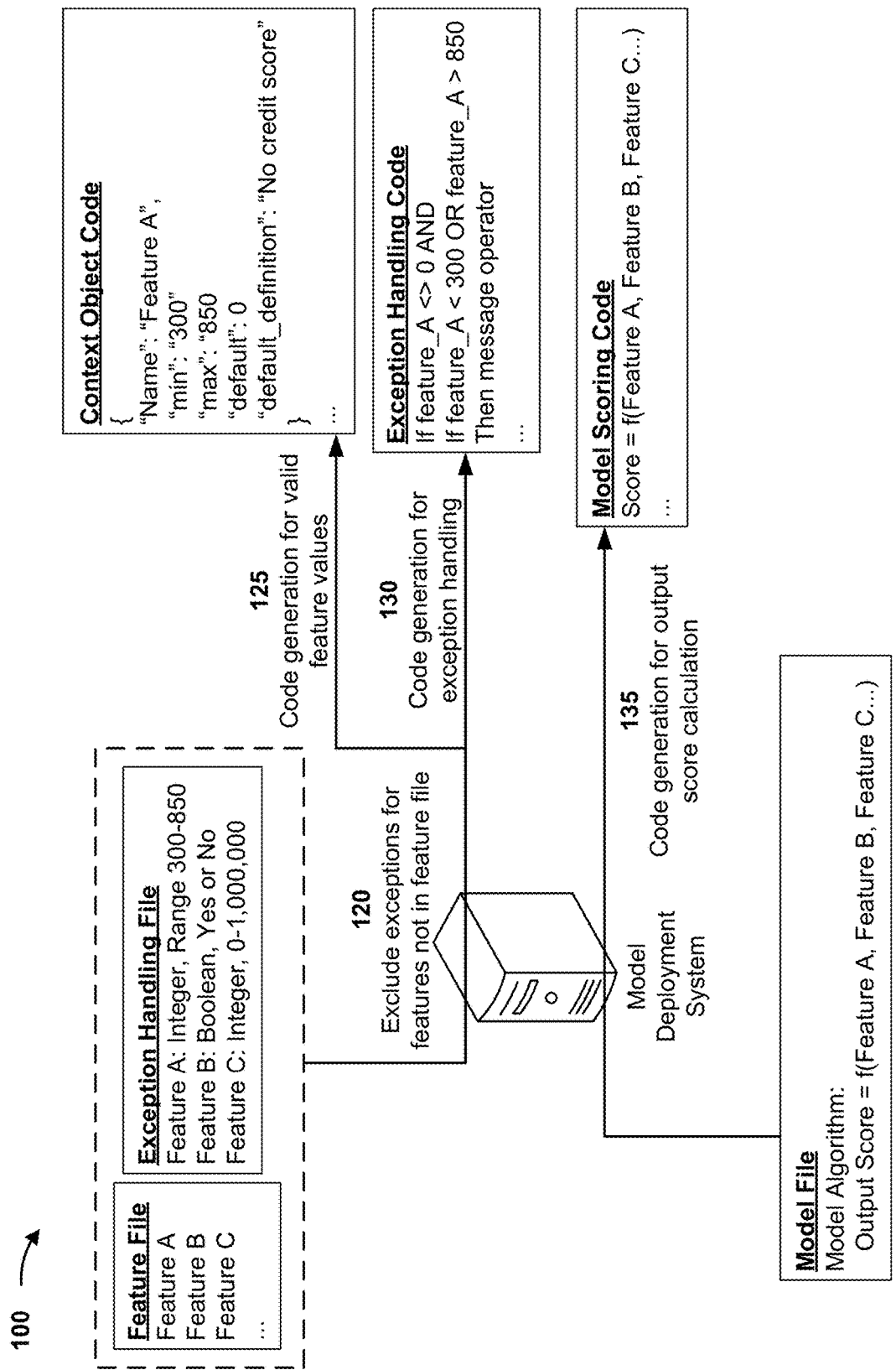
Figure 1C:
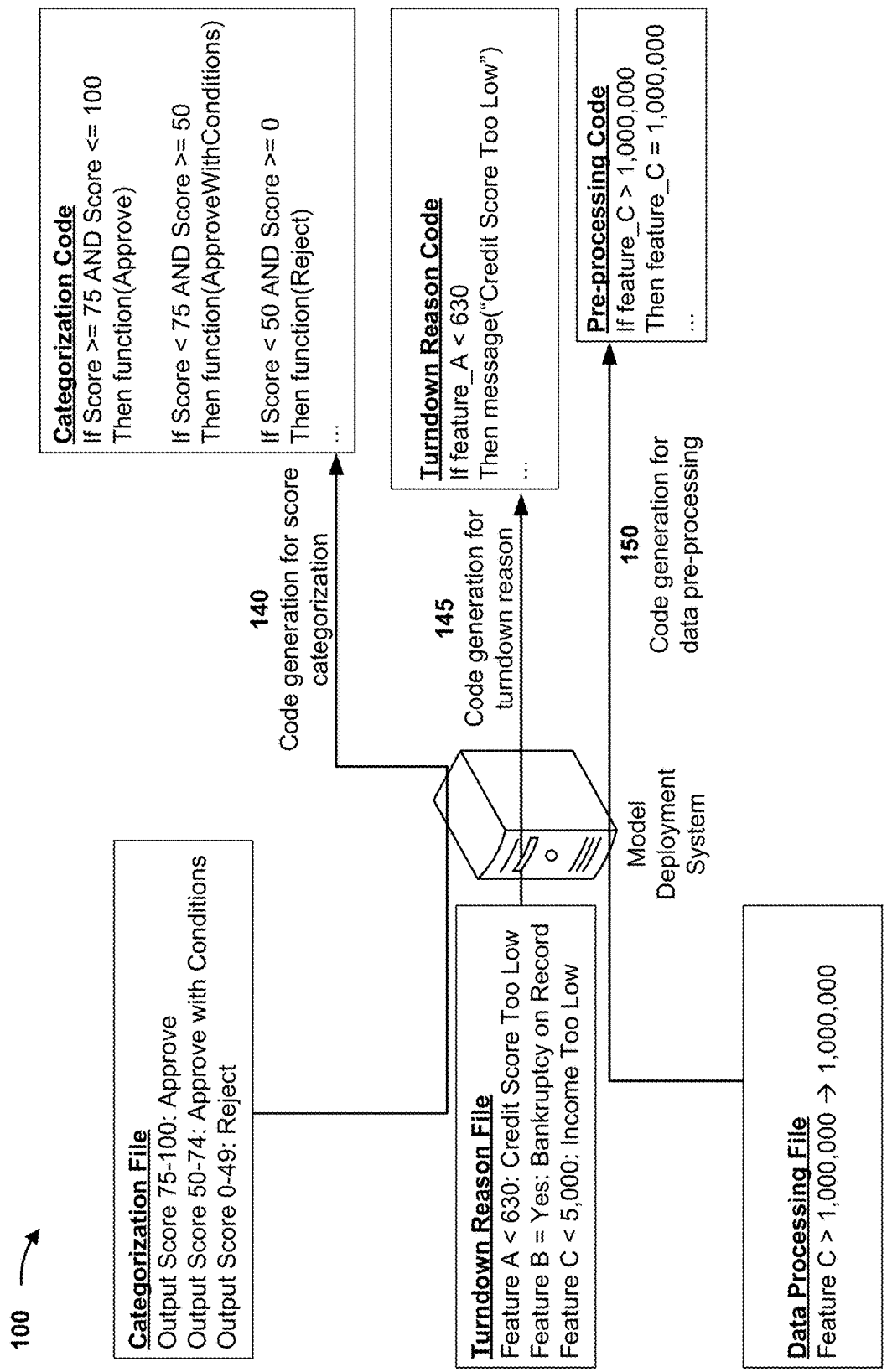

As shown in FIG. 1B, and by reference number 120, the model deployment system may exclude exceptions for features not in the feature file. As described above, the set of features determined during training may be a subset of variables associated with the observations. The exception handling file may identify valid values for features not included in the set of features, as well as the valid values for the set of features. In some implementations, the model deployment system may exclude exceptions for variables not in feature file when generating code for exception handling (reference number 130).

As further shown in FIG. 1B, and by reference number 125, the model deployment system may generate, based on the feature file and the exception handling file, code for valid feature values. In some implementations, the model deployment system may generate context object code for each feature based on the feature file and the exception handling file. The context object code for a feature defines a context object that identifies the valid values for the feature. In some implementations, the model deployment system can generate the context object code for a feature by populating context information for the feature from the exception handling file. For example, as shown in FIG. 1B, the context information may include the feature name for a feature, a minimum value for the feature, a maximum value for the feature, a default value for the feature (e.g., when a deployed model does not receive an input value for that feature, such as when a user applying for credit does not provide an input value via a user interface), and a default definition associated with the default value. In the example of FIG. 1B, if an applicant does not have a credit score (e.g., is applying for credit for the first time), as indicated by the default definition of "No credit score," then a default value of 0 may be used for Feature A when executing the deployed model. In some implementations, the context object code may include code that identifies the feature from the feature file and code that retrieves the context information from the exception handling file.

As further shown in FIG. 1B, and by reference number 130, the model deployment system may generate, based on the feature file and the exception handling file, exception handling code. The exception handling code may include code that causes an exception to be triggered if an invalid value is received for a feature. For example, the exception handling code may be generated based on the invalid values and the exception actions identified in the exception handling file. For example, the exception handling code may cause (e.g., when executed) notification of an operator if a particular invalid value is received for a feature. Additionally, or alternatively, the exception handling code may provide an error message that requests a user re-submit a valid value if a particular invalid value is received for a feature.

As further shown in FIG. 1B, and by reference number 135, the model deployment system may generate, based on the model file, model scoring code for output score calculation. The model scoring code may include code to perform the operations identified in the model file using the model parameters in the model file and received values for a set of variables corresponding to the set of features. The model scoring code may include one or more functions that are executed on the set of variables to determine an output score. The one or more functions may include model parameters, which may be applied to the set of variables (e.g., as weights or biases). In some implementations, the one or more functions or other operations may be performed on the set of variables in a particular order to generate the output score.

As shown in FIG. 1C, and by reference number 140, the model deployment system may generate, based on the categorization file, categorization code that causes (e.g., when executed) selection of a category based on the output score. The categorization code may define the output score ranges and the corresponding categories based on the categorization file. In some implementations, the model deployment system may retrieve the category ranges and corresponding categories from the categorization file, and may populate fields for the categorization ranges and corresponding categories in a categorization code template.

As further shown in FIG. 1C, and by reference number 145, the model deployment system may generate, based on the turndown reason file, turndown reason code. The turndown reason code may cause (e.g., when executed) selection of a turndown reason from a set of turndown reasons based on the input values received for the set of features. The turndown reason code may be used to select the turndown reason in cases in which the output score falls into a particular category or indicates a particular result. For example, the turndown reason code may be used to select the turndown reason in cases in which the applicant is rejected. In some implementations, the model deployment system may retrieve the turndown reasons and corresponding input feature values from the turndown reason file, and may populate fields for the turndown reasons and corresponding input feature values in a turndown code template.

As further shown in FIG. 1C, and by reference number 150, the model deployment system may generate, based on the data processing file, pre-processing code to perform pre-processing of one or more input feature values. For example, the pre-processing code may select or determine a processed value for an input value of a feature based on the data processing file. In some implementations, the model deployment system may retrieve the input feature values to be pre-processed and corresponding processed values or processing operations from the data processing file, and may populate fields for the input feature values to be pre-processed and corresponding processed values or processing operations in a pre-processing code template.

Figure 1D:
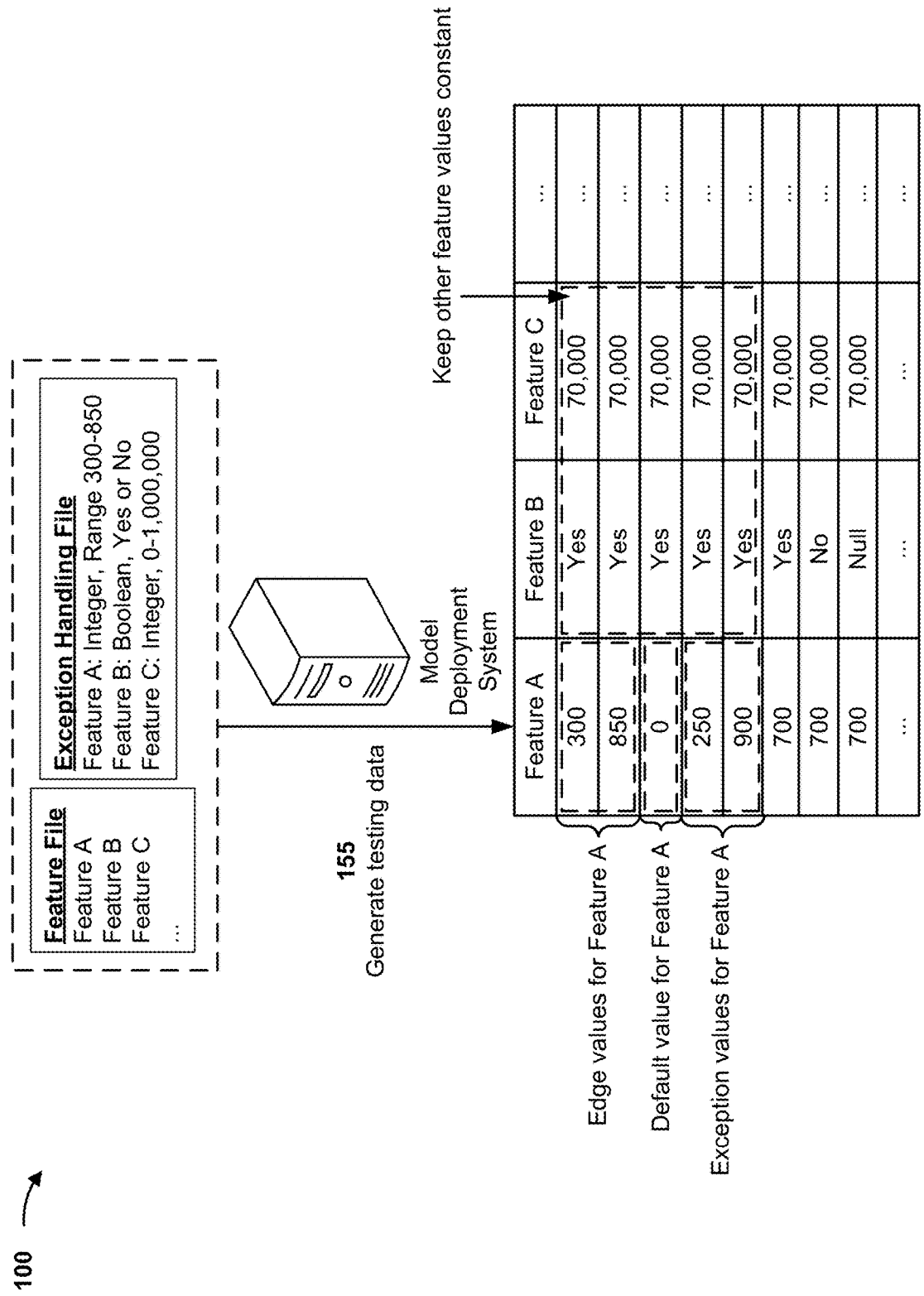

As shown in FIG. 1D, and by reference number 155, the model deployment system may generate testing data based on the feature file and the exception handling file. In some implementations, prior to deploying the trained model using the generated code, the model deployment system may perform testing of various scenarios for the input feature values. The model deployment system may generate simulated testing data to test the code that is generated for the trained model. For example, the model deployment system may generate the simulated testing data from a set of training data by varying one feature to different values while keeping the values of the other features constant. In some implementation, the model deployment system may vary a value of a feature to generate testing data for edge values for the feature, exception values for the feature, and/or a default value for the feature. For example, an edge value may include the minimum value for the feature or the maximum value for the feature, identified in the exception handling file. An exception values may include a value below the minimum value or above the maximum value. In some implementations in which the exception handling file identifies an enumerated set of values for a feature, the feature can be varied to generate testing data for each value in the enumerated set of values.

Figure 1E:
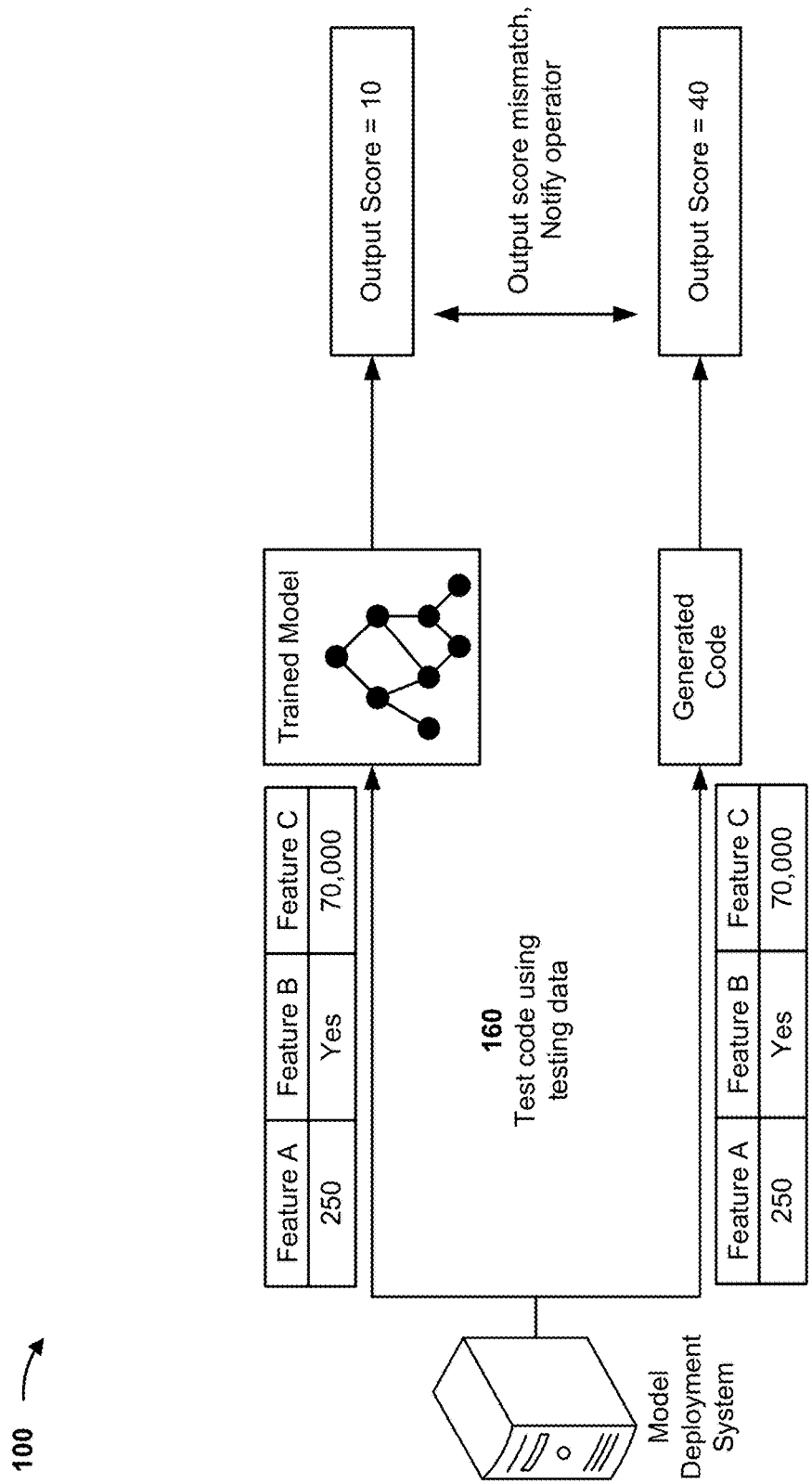

As shown in FIG. 1E, and by reference number 160, the model deployment system may test the code generated for the trained model using the testing data. In some implementations, for each set of feature values in the testing data system, the model deployment system may input the feature values to the trained machine learning model and may input the feature values to the code generated for deploying the trained model. The model deployment system may determine a first output score calculated using the trained machine learning model and a second output score calculated using the code generated for deploying the trained model. The model deployment system may compare the first output score and the second output score, and may output a test result based on the comparison between the first output score and the second output score. For example, the model deployment may output a successful testing result if the first output score and the second output score are the same (or within a threshold), and may output an unsuccessful testing result if the first output score and the second output score are not the same. As shown in FIG. 1E, in the case of an unsuccessful testing result, the model deployment system may notify an operator. In some implementations, the model deployment system may repeat the testing for each set of feature values in the testing data.

Figure 1F:
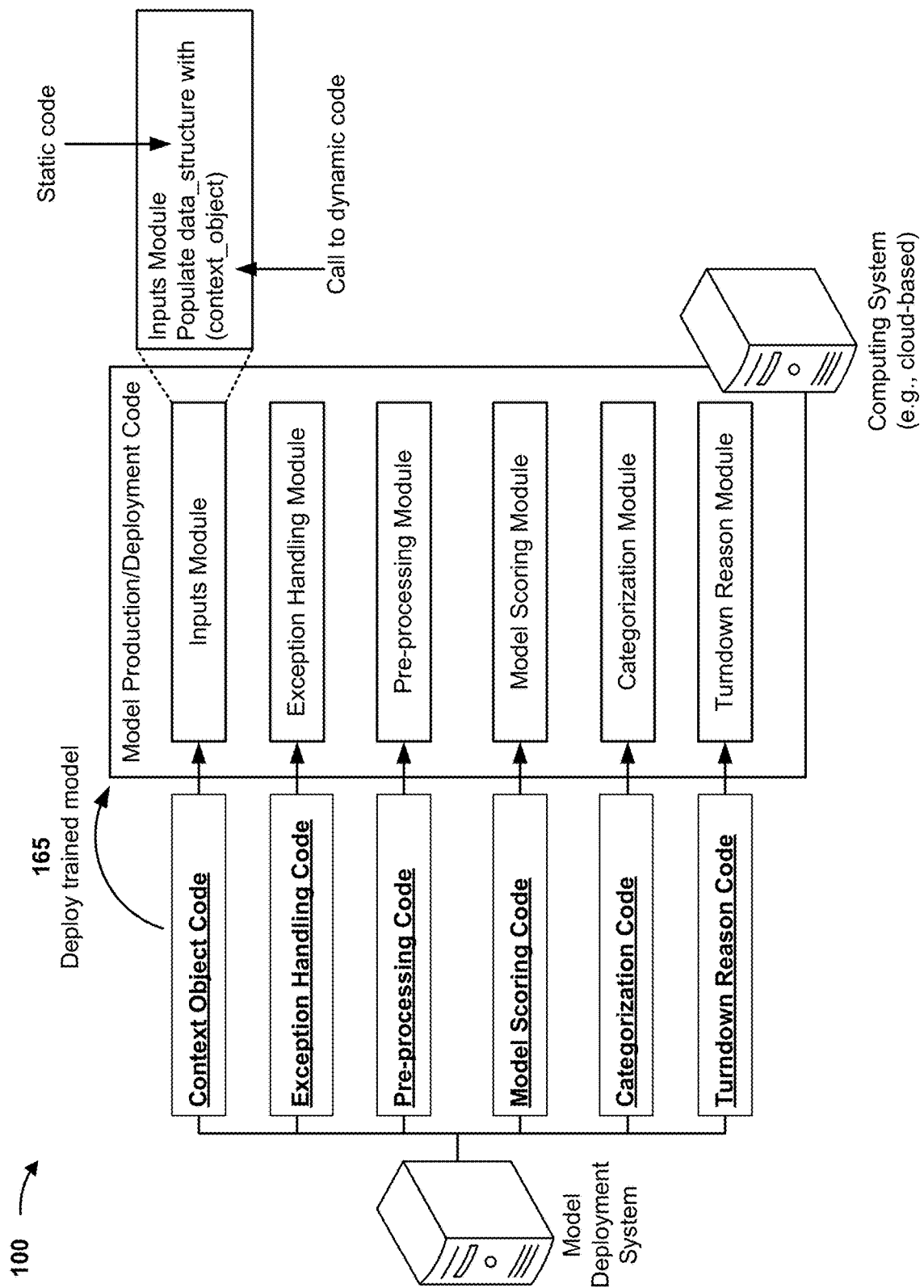

As shown in FIG. 1F, and by reference number 165, the model deployment system may deploy the trained model in a computing system (e.g., a computing environment) based on the generated code. For example, the model deployment system may deploy model deployment code (shown as model production/deployment code to indicate that the code has been deployed in a production environment) on the computing system. The computing system may be, for example, a cloud-based computing system, a container-based computing system, a microservice-based computing system, or the like. The model deployment code may include an inputs module, an exception handling module, a pre-processing module, a model scoring module, a categorization module, and/or a turndown reason module.

The inputs module may include the context object code described above. The exception handling module may include the exception handling code described above. The pre-processing module may include the pre-processing code described above. The model scoring module may include the model scoring code described above. The categorization module may include the categorization code described above. The turndown reason module may include the turndown reason code described above. In some implementations, a module may include static code and a call to dynamic code, as shown for the inputs module as an example. In the example shown in FIG. 1F, execution of the code in the inputs module causes a data structure to be populated by calling the context object code that identifies the feature set and the set of valid values for each feature in the feature set.

In some implementations, the model deployment system may include the inputs module, the exception handling module, the pre-processing module, the model scoring module, the categorization module, and/or the turndown reason module in a core model assembly, which may be included within a wrapper (e.g., an input/output wrapper or a web services wrapper) in a container. The container may then be used to deploy the code for the trained model. In some implementations, each of the modules included in the model deployment code is generated independently of the other modules include in the model deployment code. As a result, complexity of the model deployment code is reduced, resulting in easier deployment, easier maintenance, and reduced execution time. Furthermore, an individual module can be updated without requiring changes to other modules.

Using the techniques described herein, the building time for generating code for deploying a trained model may be reduced, and the trained model may be deployed using less code and fewer dependencies. Accordingly, the time for launching and executing the trained model may be reduced, and an amount of memory consumed for storing and/or executing the trained model may be reduced. Furthermore, the code generated for deploying the trained model may be easily updated by providing a new file or files from which the code is generated.

As indicated above, FIGS. 1A-1F are provided as an example. Other examples may differ from what is described with regard to FIGS. 1A-1F.

Figure 2:
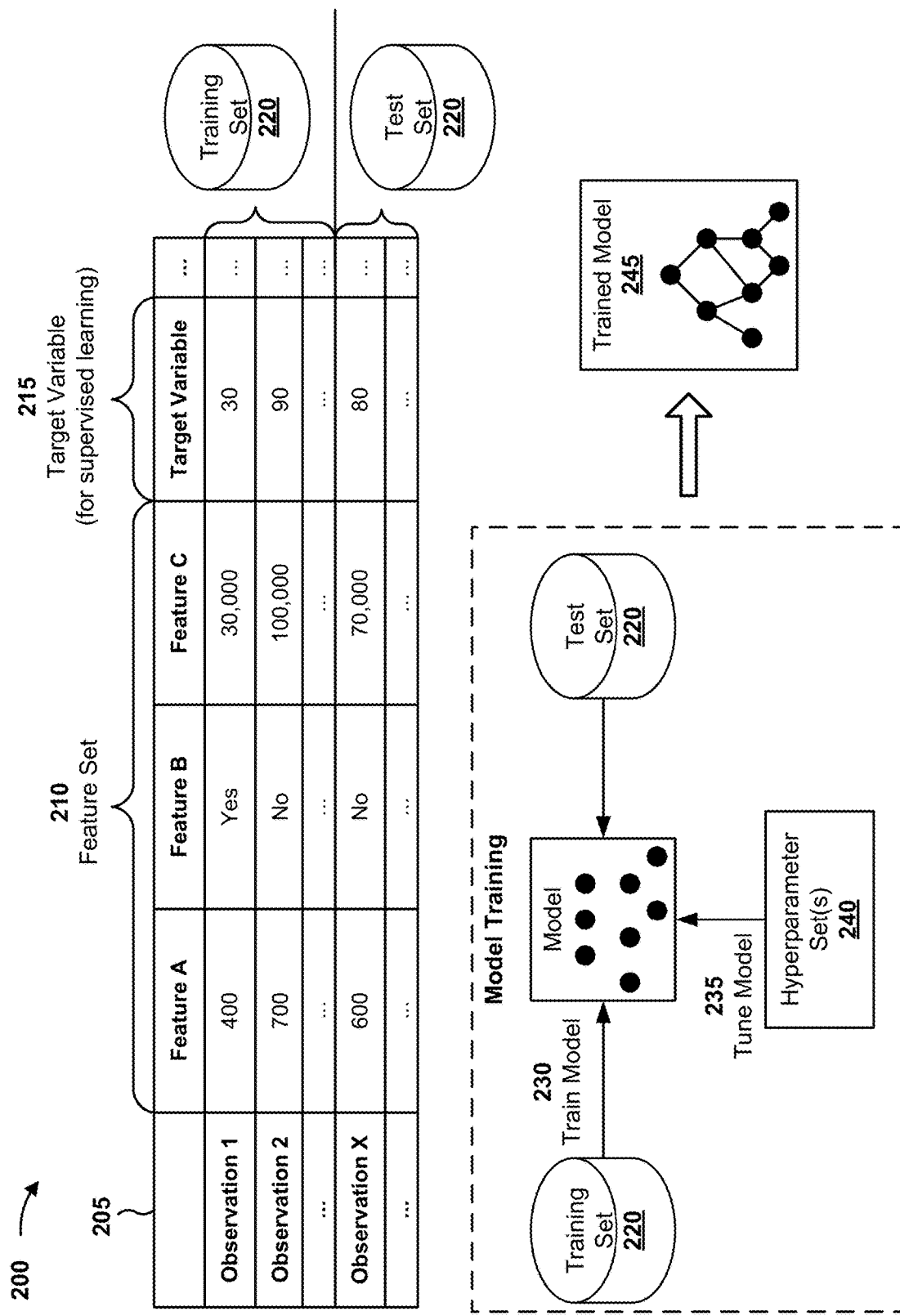
FIG. 2 is a diagram illustrating an example of training a machine learning model.

FIG. 2 is a diagram illustrating an example 200 of training a machine learning model. The machine learning model training described herein may be performed using a machine learning system. The machine learning system may include or may be included in a computing device, a server, a cloud computing environment, or the like, such as model training system, model deployment system, and/or computing system described in more detail below.

As shown by reference number 205, a machine learning model may be trained using a set of observations. The set of observations may be obtained and/or input from training data (e.g., historical data), such as data gathered during one or more processes described herein. In some implementations, the machine learning system may receive the set of observations (e.g., as input) from model training system.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from model training system. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of Feature A, a second feature of Feature B, a third feature of Feature C, and so on. As shown, for a first observation, the first feature may have a value of 400, the second feature may have a value of "Yes", the third feature may have a value of 30,000, and so on. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is probability score for determining whether an applicant is approved for a credit card, which has a value of 30 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
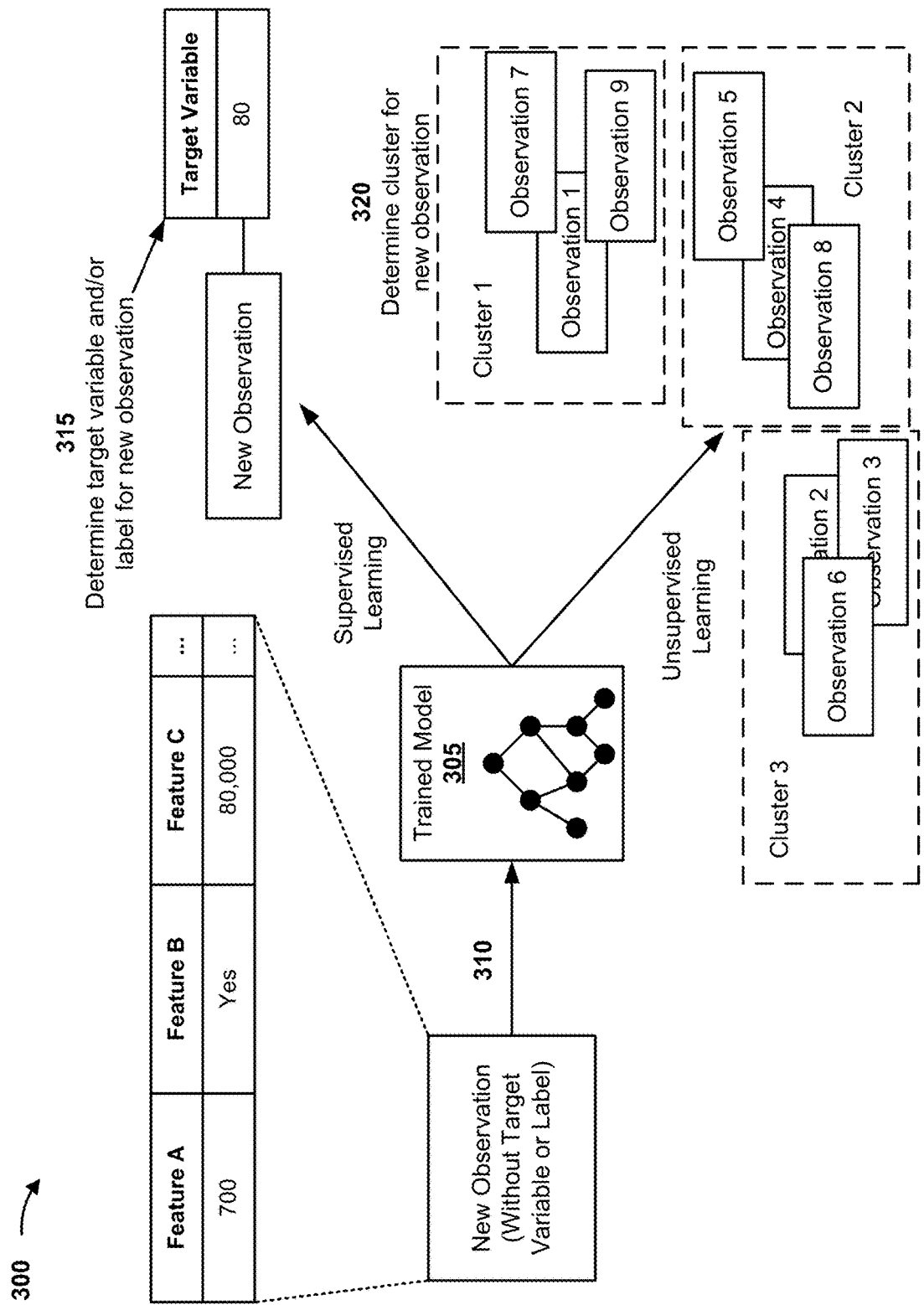
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, or a cloud computing environment, such as such as model training system, model deployment system, and/or computing system.

As shown by reference number 310, the machine learning system may receive a new observation (or a set of new observations), and may input the new observation to the machine learning model 305. As shown, the new observation may include a first feature of Feature A, a second feature of Feature B, a third feature of Feature C, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 305 may predict a value of 80 for the target variable for the new observation, as shown by reference number 315. Based on this prediction (e.g., based on the value having a particular label or classification or based on the value satisfying or failing to satisfy a threshold), the machine learning system may provide a recommendation and/or output for determination of a recommendation, such as a determination to approve a credit card for an applicant. As another example, if the machine learning system were to predict a value of 20 for the target variable, then the machine learning system may provide a different recommendation (e.g., a determination to reject a credit card for an applicant). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster, then the machine learning system may provide a first recommendation, such as determining that a credit card is approved for an applicant. As another example, if the machine learning system were to classify the new observation in a second cluster, then the machine learning system may provide a second (e.g., different) recommendation (e.g., determining that a credit card is rejected for an applicant).

In this way, the machine learning system may apply a rigorous and automated process to perform a task, such as automated decisions regarding credit cart approval. The machine learning system enables recognition and/or identification of tens, hundreds, thousands, or millions of features and/or feature values for tens, hundreds, thousands, or millions of observations, thereby increasing accuracy and consistency and reducing delay associated with perform the task relative to requiring computing resources to be allocated for tens, hundreds, or thousands of operators to manually perform the task using the features or feature values.

As indicated above, FIG. 3 is provided as an example. Other examples may differ from what is described in connection with FIG. 3.

Figure 4:
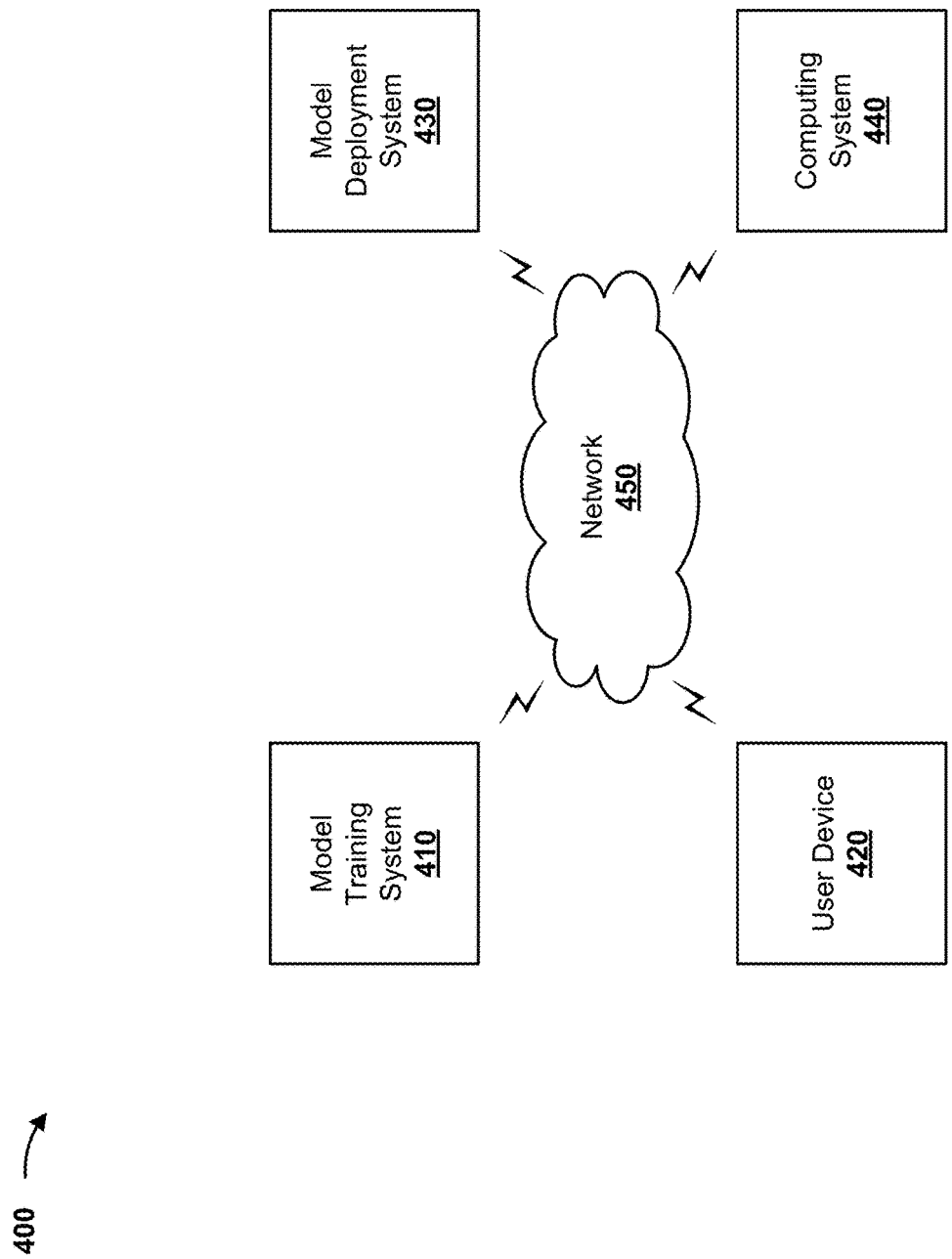
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a model training system 410, a user device 420, a model deployment system 430, a computing system 440, and a network 450. Devices of environment 400 may interconnect via wired connections, wireless connections, or a combination of wired and wireless connections.

The model training system 410 includes one or more devices capable of receiving, generating, storing, processing, providing, and/or routing information associated with code generation for deployment of a machine learning model, as described elsewhere herein. The model training system 410 may include a communication device and/or a computing device. For example, the model training system 410 may include a server, such as an application server, a client server, a web server, a database server, a host server, a proxy server, a virtual server (e.g., executing on computing hardware), or a server in a cloud computing system. In some implementations, the model training system 410 includes computing hardware used in a cloud computing environment. In some implementations, the model training system 410 may train a machine learning model, and may provide one or more computer-generated files to the model deployment system 430 for code generation. The model training system 410 may generate the one or more computer-generated files as part of training the machine learning model (e.g., during model training or shortly after model training is complete).

The user device 420 includes one or more devices capable of receiving, generating, storing, processing, and/or providing information associated with code generation for deployment of a machine learning model, as described elsewhere herein. The user device 420 may include a communication device and/or a computing device. For example, the user device 420 may include a wireless communication device, a mobile phone, a user equipment, a laptop computer, a tablet computer, a desktop computer, or a similar type of device. In some implementations, the user device 420 may be used to provide one or more user-generated files to the model deployment system 430 for code generation.

The model deployment system 430 includes one or more devices capable of receiving, generating, storing, processing, providing, and/or routing information associated with code generation for deployment of a machine learning model, as described elsewhere herein. The model deployment system 430 may include a communication device and/or a computing device. For example, the model deployment system 430 may include a server, such as an application server, a client server, a web server, a database server, a host server, a proxy server, a virtual server (e.g., executing on computing hardware), or a server in a cloud computing system. In some implementations, the model deployment system 430 includes computing hardware used in a cloud computing environment. The model deployment system 430 may generate code for deploying the machine learning model based on input received from the model training system 410 and/or the user device 420.

The computing system 440 includes one or more devices capable of receiving, generating, storing, processing, providing, and/or routing information associated with code generation for deployment of a machine learning model, as described elsewhere herein. The computing system 440 may include a communication device and/or a computing device. For example, the computing system 440 may include a server, such as an application server, a client server, a web server, a database server, a host server, a proxy server, a virtual server (e.g., executing on computing hardware), or a server in a cloud computing system. In some implementations, the computing system 440 includes computing hardware used in a cloud computing environment.

In some implementations, the model deployment system deploys the model deployment code on the computing system 440. The computing system 440 may receive inputs after the model has been deployed, and may execute the model deployment code on those inputs to generate an output score. In some implementations, the computing system 440 may interact with a client device (e.g., a desktop computer, a wireless communication device, or the like) to indicate an outcome associated with the output score (e.g., based on a category associated with the output score). For example, the computing system 440 may indicate an outcome associated with a credit application or a pre-qualification (e.g., approve, rejection, or conditionally approve), an outcome associated with a marketing decision (e.g., whether to send marketing materials to a particular person), or the like.

The network 450 includes one or more wired and/or wireless networks. For example, the network 450 may include a cellular network, a public land mobile network, a local area network, a wide area network, a metropolitan area network, a telephone network, a private network, the Internet, and/or a combination of these or other types of networks. The network 450 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
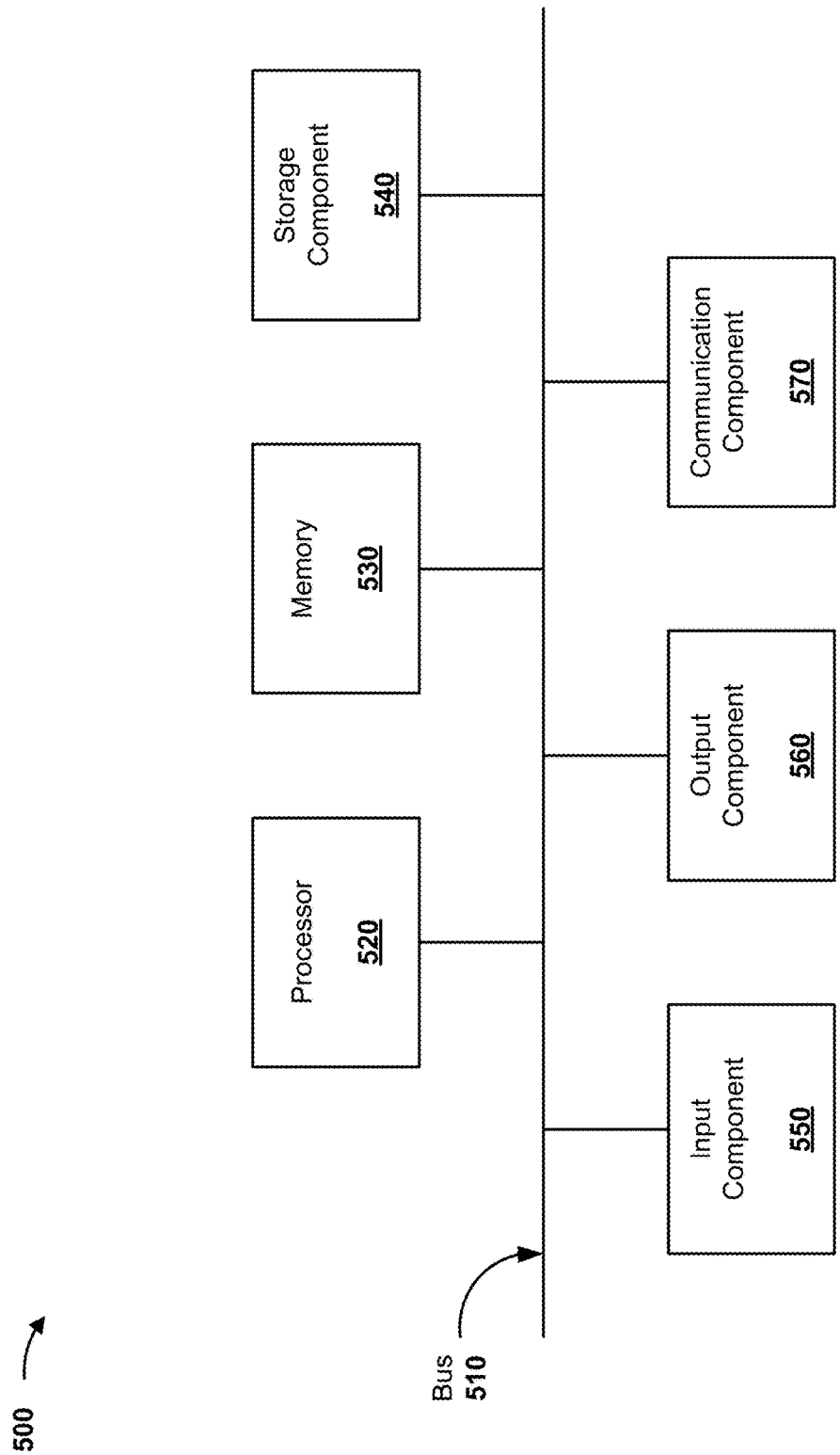
FIG. 5 is a diagram of example components of one or more devices of FIG. 4.

FIG. 5 is a diagram of example components of a device 500, which may correspond to the model training system 410, the user device 420, the model deployment system 430, and/or the computing system 440. In some implementations, the model training system 410, the user device 420, the model deployment system 430, and/or the computing system 440 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
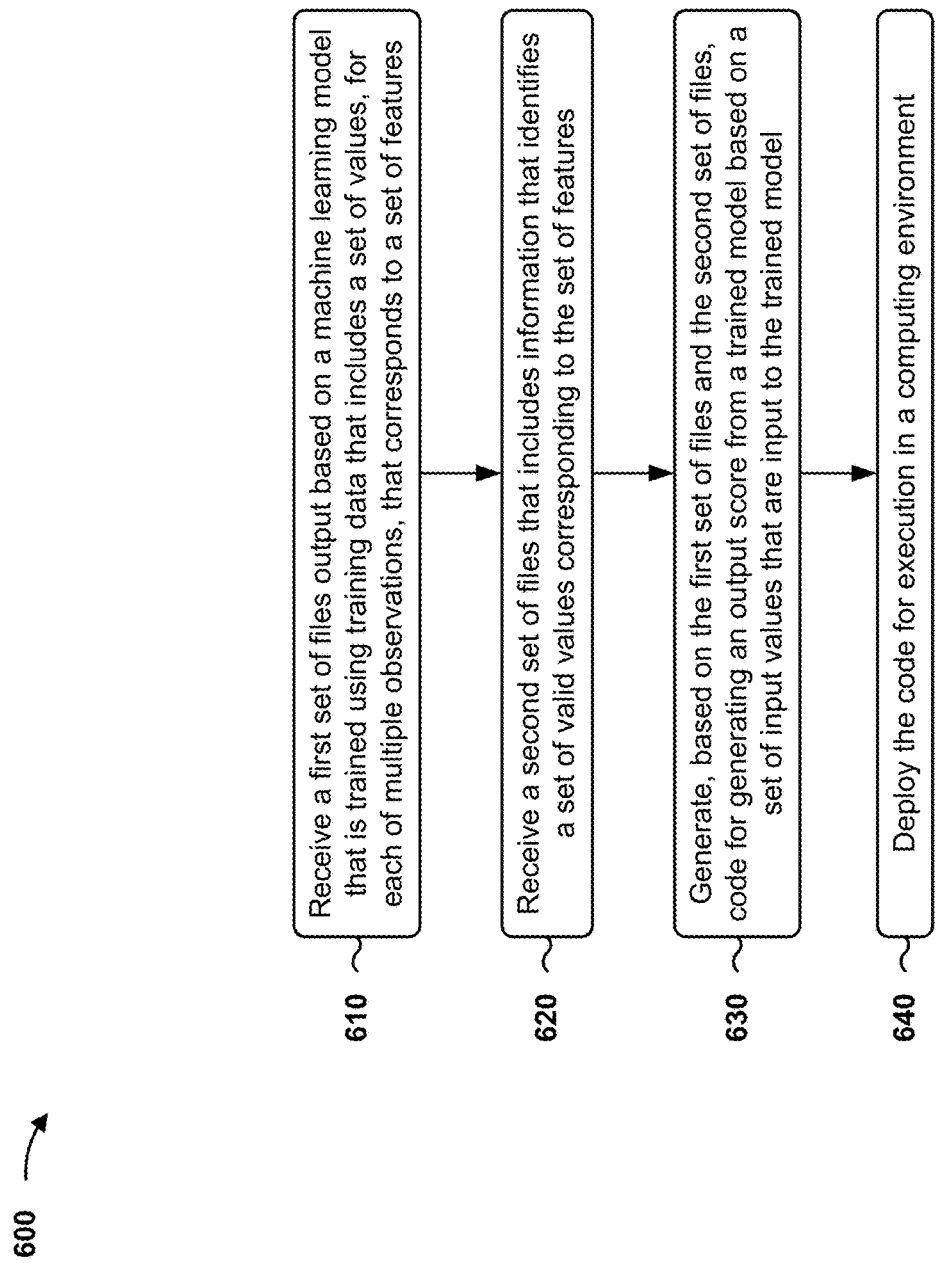
FIG. 6 is a flowchart of an example process relating to code generation for deployment of a machine learning model.

FIG. 6 is a flowchart of an example process 600 associated with code generation for deployment of a machine learning model. In some implementations, one or more process blocks of FIG. 6 may be performed by a system (e.g., model training system 410, model deployment system 430, and/or computing system 440). In some implementations, one or more process blocks of FIG. 6 may be performed by another device or a group of devices separate from or including the system, such as model training system 410, user device 420, model deployment system 430, and/or computing system 440. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving a first set of files output based on a machine learning model that is trained using training data that includes a set of values, for each of multiple observations, that corresponds to a set of features (block 610). As further shown in FIG. 6, process 600 may include receiving a second set of files that includes information that identifies a set of valid values corresponding to the set of features (block 620). As further shown in FIG. 6, process 600 may include generating, based on the first set of files and the second set of files, code for generating the output score from the trained model based on a set of input values that are input to the trained model (block 630). As further shown in FIG. 6, process 600 may include deploying the code for execution in a computing environment (block 640).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for generating code for deploying a trained model based on one or more files output in association with generating the trained model, the system comprising:
one or more memories, the one or more memories comprising one or more instructions; and
one or more processors, coupled to the one or more memories, that, when executing the one or more instructions, are configured to:
determine a set of features, to be used as input to the trained model, based on training a machine learning model using training data that includes a set of values, for each of multiple observations, that corresponds to the set of features;
generate a model algorithm for the trained model based on training the machine learning model, wherein the model algorithm defines a manner in which an output score is generated from the set of features and from a set of model parameters that are determined based on training the machine learning model;
output a feature file that identifies the set of features;
output a model file that identifies the model algorithm;
receive an exception handling file that identifies a set of valid values corresponding to the set of features;
generate, based on the feature file and the exception handling file, first code that includes a context object that identifies, for a feature of the set of features, a set of valid values for the feature;
generate, based on the model file, second code for generating the output score based on a set of variable values, corresponding to the set of features, and the set of model parameters;
generate, based on the model file, third code that is executed if an invalid value is received for the feature; and
deploy the trained model in a computing environment based on the first code, the second code, and the third code.

2. The system of claim 1, wherein the one or more processors are further configured to:
receive a categorization file that identifies mappings between a plurality of sets of output scores and a corresponding plurality of categories; and
generate, based on the categorization file, fourth code for selecting a category, of the plurality of categories, based on the output score, and
wherein the one or more processors, when deploying the trained model, are configured to deploy the trained model in the computing environment based on the first code, the second code, the third code, and the fourth code.

3. The system of claim 1, wherein the one or more processors are further configured to:
receive a turndown reason file that identifies mappings between a plurality of sets of input values, for one or more features of the set of features, and a corresponding plurality of turndown reasons; and
generate, based on the turndown reason file, fifth code for selecting a turndown reason, of the plurality of turndown reasons, based on one or more input values received for the set of features, and
wherein the one or more processors, when deploying the trained model, are configured to deploy the trained model in the computing environment based on the first code, the second code, the third code, and the fifth code.

4. The system of claim 1, wherein the one or more processors are further configured to:
receive a data processing file that identifies mappings between one or more sets of input values, for one or more features of the set of features, and a corresponding one or more processed input values to be used as input to the trained model; and
generate, based on the data processing file, sixth code for selecting a processed input value, of the one or more processed input values, based on one or more input values received for the set of features, and
wherein the one or more processors, when deploying the trained model, are configured to deploy the trained model in the computing environment based on the first code, the second code, the third code, and the sixth code.

5. The system of claim 1, wherein the exception handling file identifies at least one of a data type for the feature, a minimum valid value for the feature, a maximum valid value for the feature, a default value for the feature, or a set of valid enumerated values for the feature, and
wherein the one or more processors are further configured to determine the set of valid values corresponding to the set of features based on at least one of the data type for the feature, the minimum valid value for the feature, the maximum valid value for the feature, or the default value for the feature.

6. The system of claim 5, wherein the one or more processors are further configured to:
generate multiple sets of test values for testing the trained model, wherein a set of test values, of the multiple sets of test values, includes at least one of:
the minimum valid value, the maximum valid value, the default value, and one or more invalid values determined based on the minimum valid value and the maximum valid value, or
each enumerated value included in the set of valid enumerated values and one or more values that are not included in the set of valid enumerated values; and
store the multiple sets of test values.

7. The system of claim 6, wherein the one or more processors are further configured to:
determine a first output score generated based on providing the set of test values as input to the machine learning model;

determine a second output score generated based on providing the set of test values as input to the trained model;
compare the first output score and the second output score; and
output a test result based on comparing the first output score and the second output score.

8. A method for generating code for deploying a trained model based on one or more files output in association with generating the trained model, the method comprising:
determining a set of features, to be used as input to the trained model, based on training a machine learning model using training data that includes a set of values, for each of multiple observations, that corresponds to the set of features;
generating a model algorithm for the trained model based on training the machine learning model,
wherein the model algorithm includes a function for generating an output score based on the set of features and a set of model parameters that are determined based on training the machine learning model;
receiving, by a system, a first set of files output based on the machine learning model,
wherein the first set of files includes information that identifies the set of features and the model algorithm;
receiving, by the system, a second set of files that includes information that identifies a set of valid values corresponding to the set of features;
generating, by the system and based on the first set of files and the second set of files, code for generating the output score from the trained model based on a set of input values that are input to the trained model,
wherein the code includes:
a data object that identifies, for a feature of the set of features, a set of valid values for the feature,
one or more instructions for generating the output score based on a set of variable values, corresponding to the set of features, and the set of model parameters, and
one or more instructions that are executed if an invalid value is received for the feature; and
deploying, by the system, the code for execution in a computing environment.

9. The method of claim 8, wherein the second set of files includes information that identifies mappings between a plurality of sets of output scores and a corresponding plurality of categories, and
wherein the code further includes one or more instructions for selecting a category, of the plurality of categories, based on the output score.

10. The method of claim 8, wherein the second set of files includes information that identifies mappings between a plurality of sets of input values, for one or more features of the set of features, and a corresponding plurality of turn-down reasons, and
wherein the code further includes one or more instructions for selecting a turndown reason, of the plurality of turndown reasons, based on one or more input values received for the set of features.

11. The method of claim 8, further comprising:
generating multiple sets of test values for testing the trained model, wherein a set of test values, of the multiple sets of test values, is generated based on the second set of files and includes a minimum valid value, a maximum valid value, a default value, and one or more invalid values for a feature; and
outputting the multiple sets of test values for testing the trained model.

12. The method of claim 11, further comprising:
determining a first output score generated based on providing the set of test values as input to the machine learning model;
determining a second output score generated based on providing the set of test values as input to the trained model;
comparing the first output score and the second output score; and
outputting a test result based on comparing the first output score and the second output score.

13. The method of claim 8, further comprising:
generating multiple sets of test values for testing the trained model, wherein a set of test values, of the multiple sets of test values, is generated based on the second set of files and includes:
one or more enumerated values included in a set of valid enumerated values for a feature, and
one or more values that are not included in the set of valid enumerated values for the feature; and
outputting the multiple sets of test values for testing the trained model.

14. The method of claim 13, further comprising:
determining a first output score generated based on providing the set of test values as input to the machine learning model;
determining a second output score generated based on providing the set of test values as input to the trained model;
comparing the first output score and the second output score; and
outputting a test result based on comparing the first output score and the second output score.

15. A non-transitory computer-readable medium storing a set of instructions, the set of instructions comprising:
one or more instructions that, when executed by one or more processors of a device, cause the device to:
determine a set of features, to be used as input to a trained model, based on training a machine learning model using training data that includes a set of values, for each of multiple observations, that corresponds to the set of features;
generate a model algorithm for the trained model based on training the machine learning model,
wherein the model algorithm includes a function for generating an output score based on the set of features and a set of model parameters that are determined based on training the machine learning model;
generate, based on a first file that is output as part of training the machine learning model, code for a first module of a computer program,
wherein the code for the first module causes reception of a set of input values that are input to the computer program and mapping of the set of input values to the set of features, and
wherein the computer program, when executed, generates an output from the trained machine learning model based on the set of input values;
generate, based on a second file that is output as part of training the machine learning model, code for a second module of the computer program,
wherein the code for the second module causes the model algorithm to be applied to the set of input values to generate the output; and store the computer program, including the code generated for the first module and the code generated for the second module, in memory of the device.

16. The non-transitory computer-readable medium of claim 15, wherein the one or more instructions, when executed by the one or more processors, cause the device to:
generate, based on one or more input files, code for a third module of the computer program, wherein the code for the third module causes exception handling to be performed if an input value, of the set of input values, is invalid for a feature to which the input value is mapped based on execution of the code for the first module.

17. The non-transitory computer-readable medium of claim 15, wherein the one or more instructions, when executed by the one or more processors, cause the device to:
generate, based on one or more input files, code for a fourth module of the computer program,
wherein the code for the fourth module causes selection of a category, of a plurality of categories, based on the output and further causes an action to be performed based on the category, and
wherein different categories, of the plurality of categories, are associated with different outputs and different actions.

18. The non-transitory computer-readable medium of claim 15, wherein the one or more instructions, when executed by the one or more processors, cause the device to:
generate, based on one or more input files, code for a fifth module of the computer program,
wherein the code for the fifth module causes selection of a turndown reason, of a plurality of turndown reasons, based on one or more input values of the set of input values, and
wherein different turndown reasons, of the plurality of turndown reasons, are associated with different input values.

19. The non-transitory computer-readable medium of claim 15, wherein the one or more instructions, when executed by the one or more processors, cause the device to:
generate, based on one or more input files, code for a sixth module of the computer program,
wherein the code for the sixth module causes modification of an input value, of the set of input values, to form a modified input value or a new input value, and
wherein the code for the second module further causes the model algorithm to be applied to the modified input value or the new input value, rather than the input value, to generate the output.

20. The non-transitory computer-readable medium of claim 15, wherein the one or more instructions, when executed by the one or more processors, cause the device to:
receive an updated file that is output based on retraining the machine learning model, wherein the updated file identifies a new model algorithm to replace the model algorithm;
regenerate the code for the second module based on the new model algorithm, without regenerating code for one or more other modules of the computer program; and
store the computer program, including the code regenerated for the second module, in the memory of the device.

* * * * *